United States Patent [19]

Anderson et al.

[11] 3,910,438
[45] Oct. 7, 1975

[54] MOBILE HAY STACKER CONVEYOR CONSTRUCTION

[75] Inventors: Joseph A. Anderson; Ruben D. Morlock; Chester G. Neukom, all of Jamestown, N. Dak.

[73] Assignee: Haybuster Manufacturing, Inc., Jamestown, N. Dak.

[22] Filed: Nov. 15, 1973

[21] Appl. No.: 416,072

Related U.S. Application Data

[63] Continuation-in-part of Ser. No. 252,426, May 11, 1972.

[52] U.S. Cl. ................ 214/518; 56/361; 214/9; 214/83.3
[51] Int. Cl. ............................................. B60p 1/60
[58] Field of Search ............ 198/93, 95, 107, 7 BL; 302/56, 60, 10, 61; 214/83.22, 518, 522, 83.3, 42 R, 9, 17 CB; 56/345, 356, 346, 347, 348, 349, 350, 351, 352, 353, 354, 355, 357, 358, 359, 360, 361, 364; 100/66, 68

[56] References Cited
UNITED STATES PATENTS

| 101,705 | 4/1870 | Boorman ........................... 56/360 |
| 3,075,813 | 1/1963 | Vohl ................................. 302/61 |
| 3,252,277 | 5/1966 | Weichel ............................ 56/345 |
| 3,357,749 | 12/1967 | Seymour ........................... 302/60 |
| 3,389,821 | 6/1968 | Weichel ............................ 56/345 |
| 3,720,052 | 3/1973 | Anderson et al. .................. 214/521 |

FOREIGN PATENTS OR APPLICATIONS

| 1,448,349 | 6/1966 | France ........................... 56/364 |

*Primary Examiner*—Frank E. Werner
*Assistant Examiner*—Gary Auton
*Attorney, Agent, or Firm*—Dugger, Johnson & Westman

[57] ABSTRACT

A simplified tubular hay conveyor construction for use with mobile hay stackers which provided for transferring of the hay onto a rotating platform, and includes a feeder for pushing hay through the tube and means for insuring that the hay is distributed and packed to form a stack.

9 Claims, 8 Drawing Figures

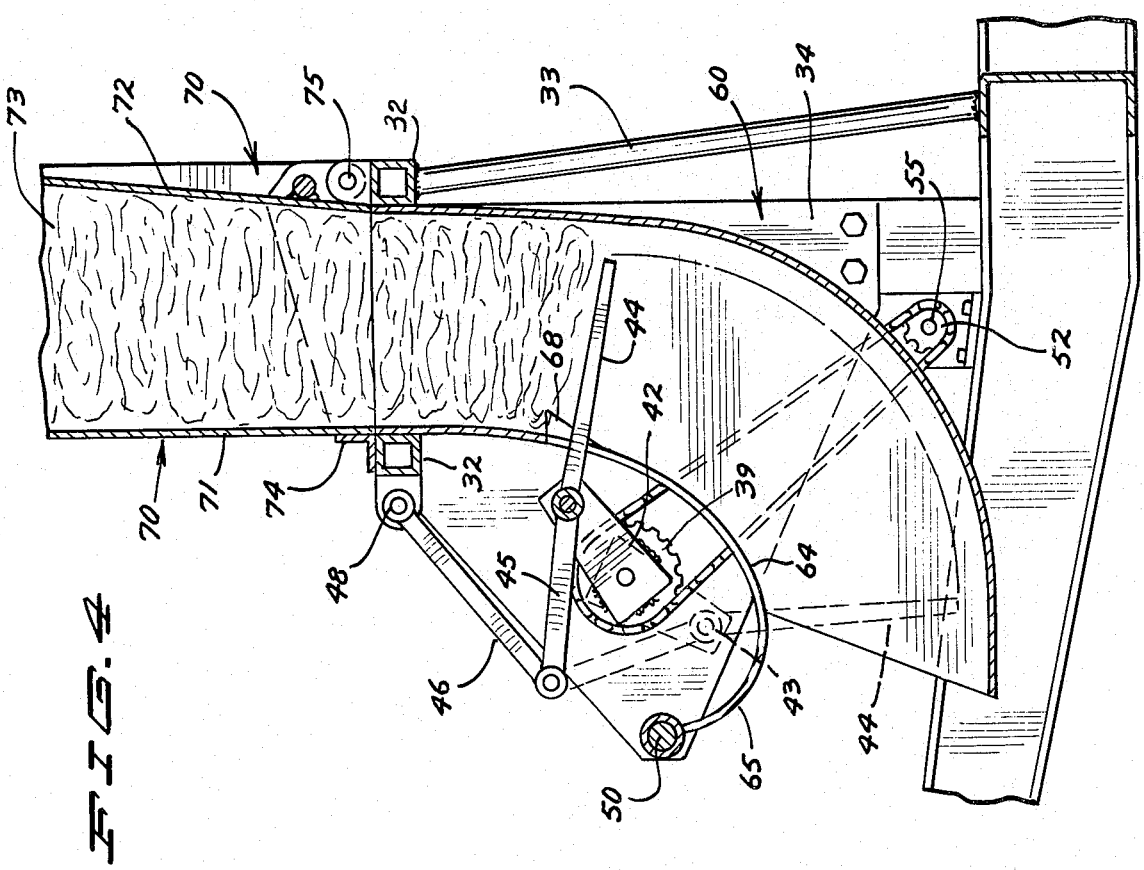
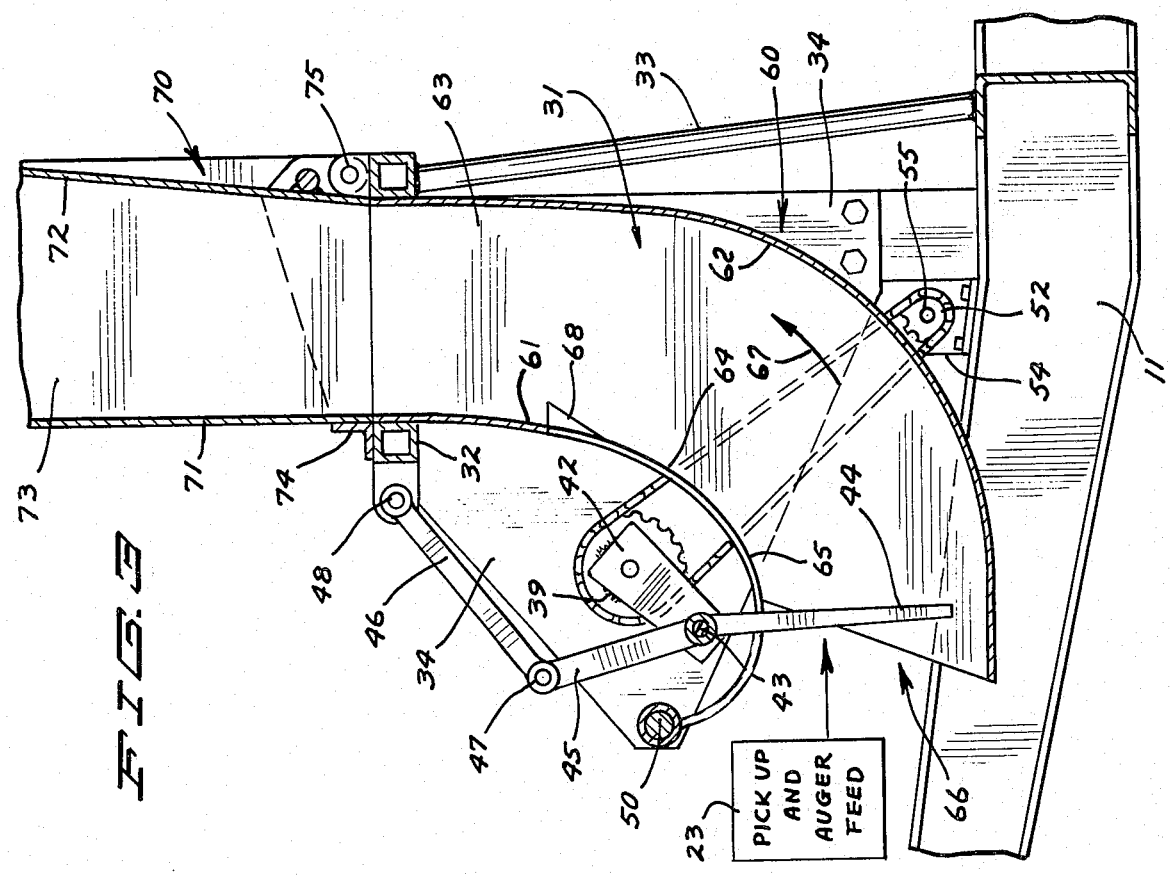

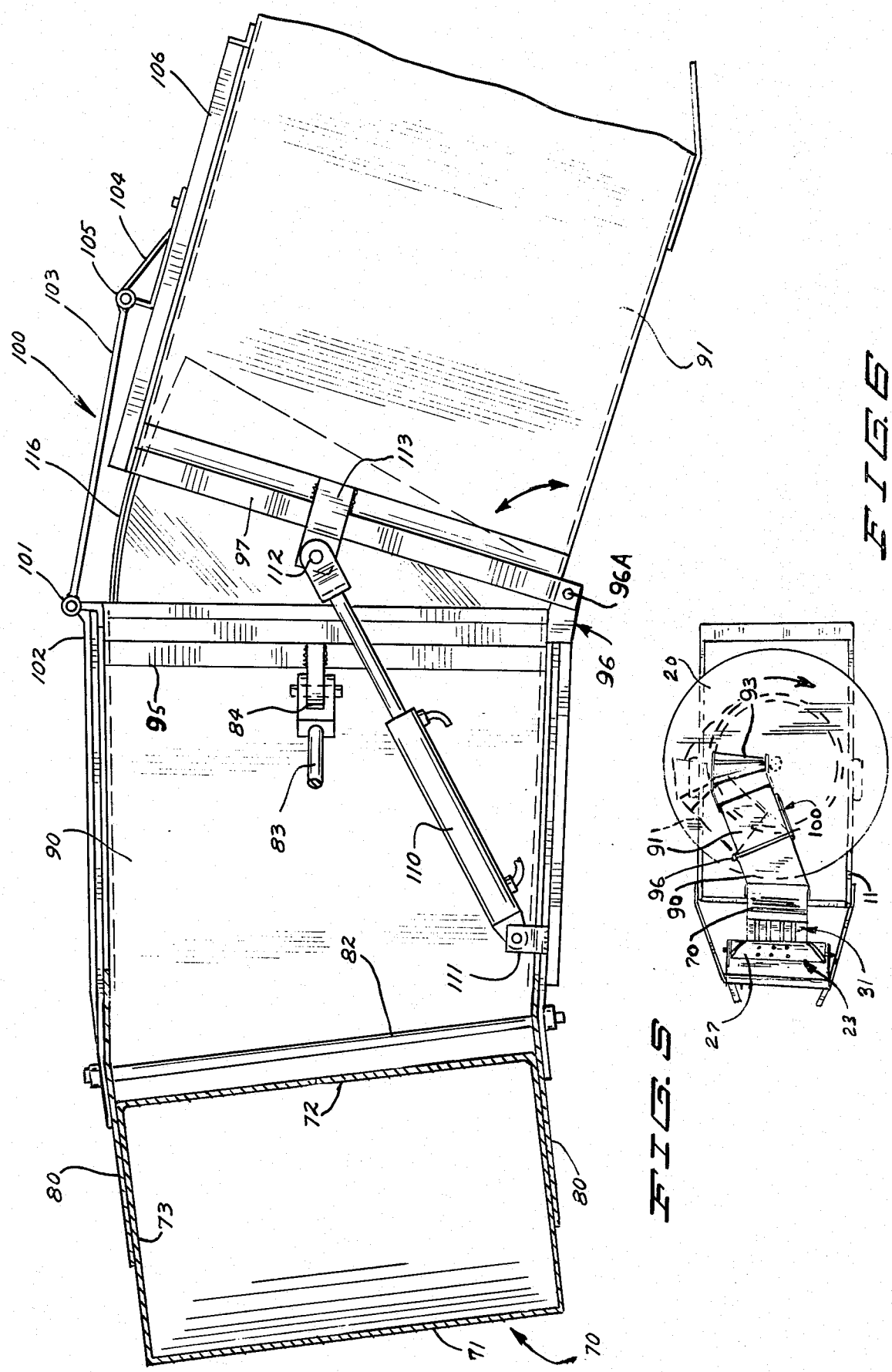

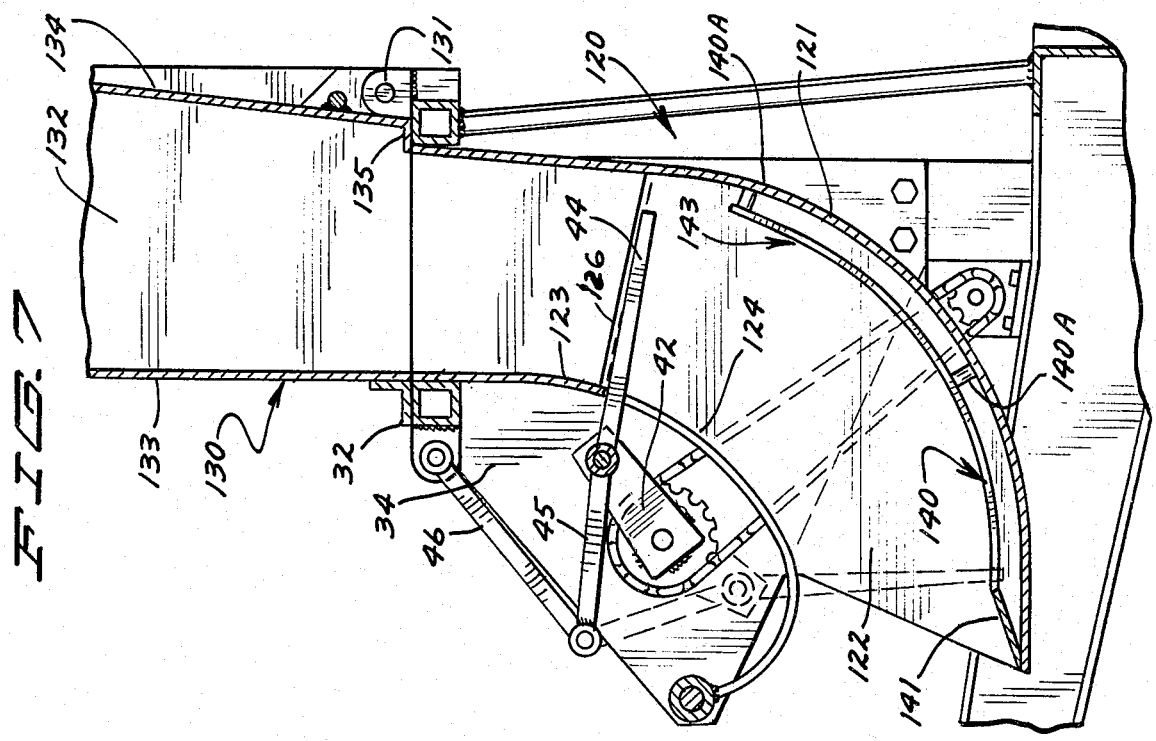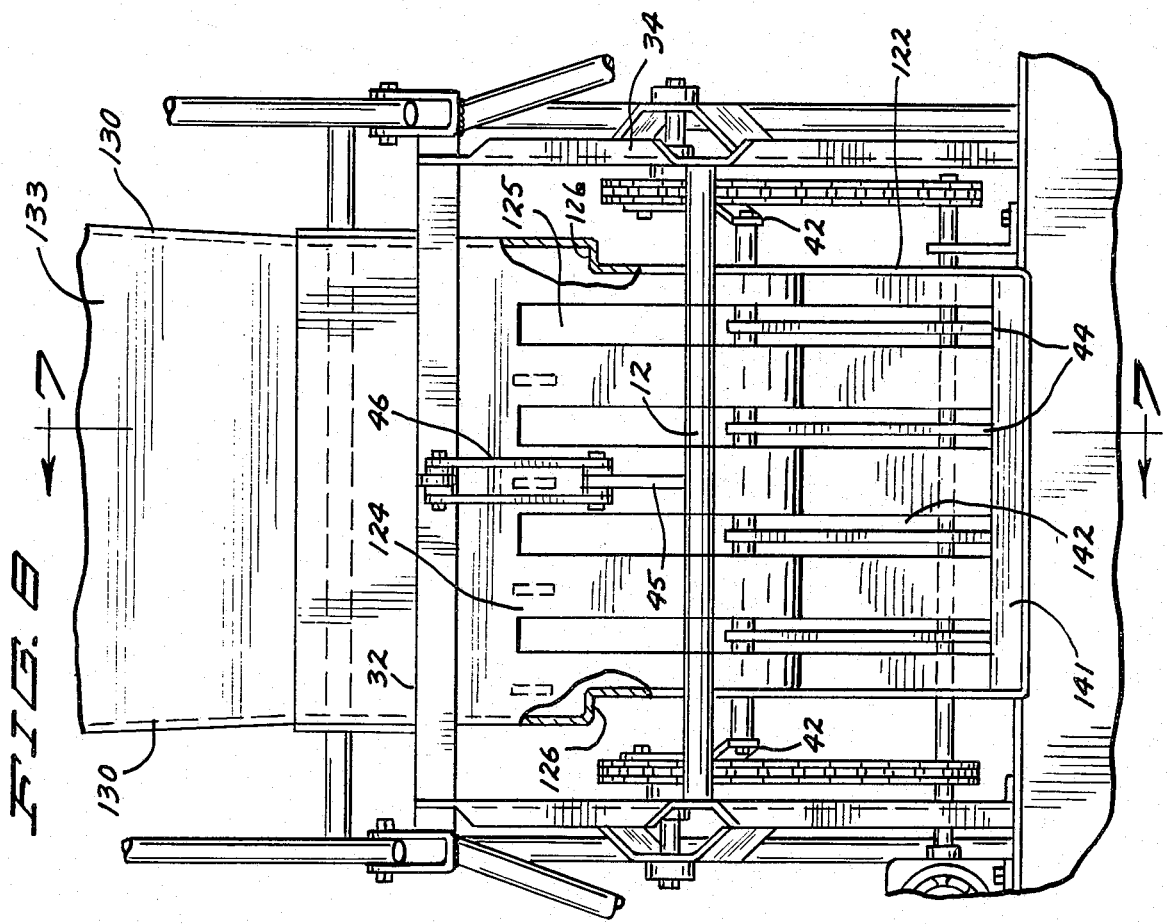

3,910,438

MOBILE HAY STACKER CONVEYOR CONSTRUCTION

CROSS REFERENCE TO RELATED APPLICATION

This application is a continuation-in-part of our co-pending application Ser. No. 252,426, filed May 11, 1972 for MOBILE HAY STACKER CONVEYOR CONSTRUCTION.

BACKGROUND OF THE INVENTION

1. Field of the Invention

The present invention relates to mobile hay stackers, and more particularly to conveyor constructions used with such stackers.

2. Prior Art

The prior co-pending U.S. Pat. No. 3,720,052 issued Mar. 13, 1973 to Joseph A. Anderson et al., for Hay Stacking Machine, illustrates a type of hay stacker that has found wide acceptance. The conveyor means as shown in the prior application involved traveling conveyor belts, and while very effective for conveying hay, the belts did increase the cost because of the necessary drive mechanism, and the cost of the belts themselves. The prior art references cited in the aforementioned prior application, also considered to be of pertinence.

In addition, hay conveyors of the general type shown herein are illustrated in the U.S. Patent to Weichel U.S. Pat. Nos. 3,252,277 and 3,423,921. These two patents however are concerned mainly with a machine for mobile loading and unloading, and are not used for stacking loose hay in combination with packing of the hay for forming the stack. U.S. Pat. No. 51,650 also shows a hay spreader and elevator which has a hay pickup means, and a chute conveyor for loading the hay.

In addition, U.S. Pat. No. 2,585,891 shows a hay loader that includes a conveyor member but has a section where hay is pushed across a chute for conveying.

SUMMARY OF THE INVENTION

The present invention relates to a hay stacking machine conveyor construction which utilizes a lower hay feeding member, and an uprightly extending chute and a lateral chute may be hinged to the upright chute through which the hay is fed laterally and rearwardly to position over a hay stack forming platform. The lateral chute is pivotable about a transverse axis for packing the hay. The chute also has a portion which can be moved laterally from side to side to move the conveyor outlet so that the area where the hay is being dropped onto the hay stack forming platform may be changed for uniform distribution.

The lateral chute conveyor section includes a free rolling packing roller which rolls over the top of the hay and packs the hay to form a dense stack.

The upright conveyor chute of the present invention expands in cross-sectional area generally from the feeder at the inlet end to the discharge opening so that the hay is not substantially compressed in the chute.

BRIEF DESCRIPTION OF THE DRAWINGS

FIG. 3 is a sectional view taken as on line 3—3 in FIG. 2 showing the feeder teeth in a first solid line position;

FIG. 4 is a sectional view taken as on the same line as FIG. 3 illustrating the feeder teeth for the conveyor assembly in a second position;

FIG. 5 is a bottom plan view of a portion of a conveyor assembly of FIG. 1 as on line 5—5 in FIG. 1;

FIG. 6 is a fragmentary, part schematic top plan view of the device of FIG. 1;

FIG. 7 is a sectional view of a modified form of the invention taken as on line 7—7 in FIG. 8, and FIG. 8 is a front view of the device of FIG. 7 showing the feeder teeth in a forward position indicated in dotted lines in FIG. 7.

DESCRIPTION OF THE PREFERRED EMBODIMENT

Figure 1:
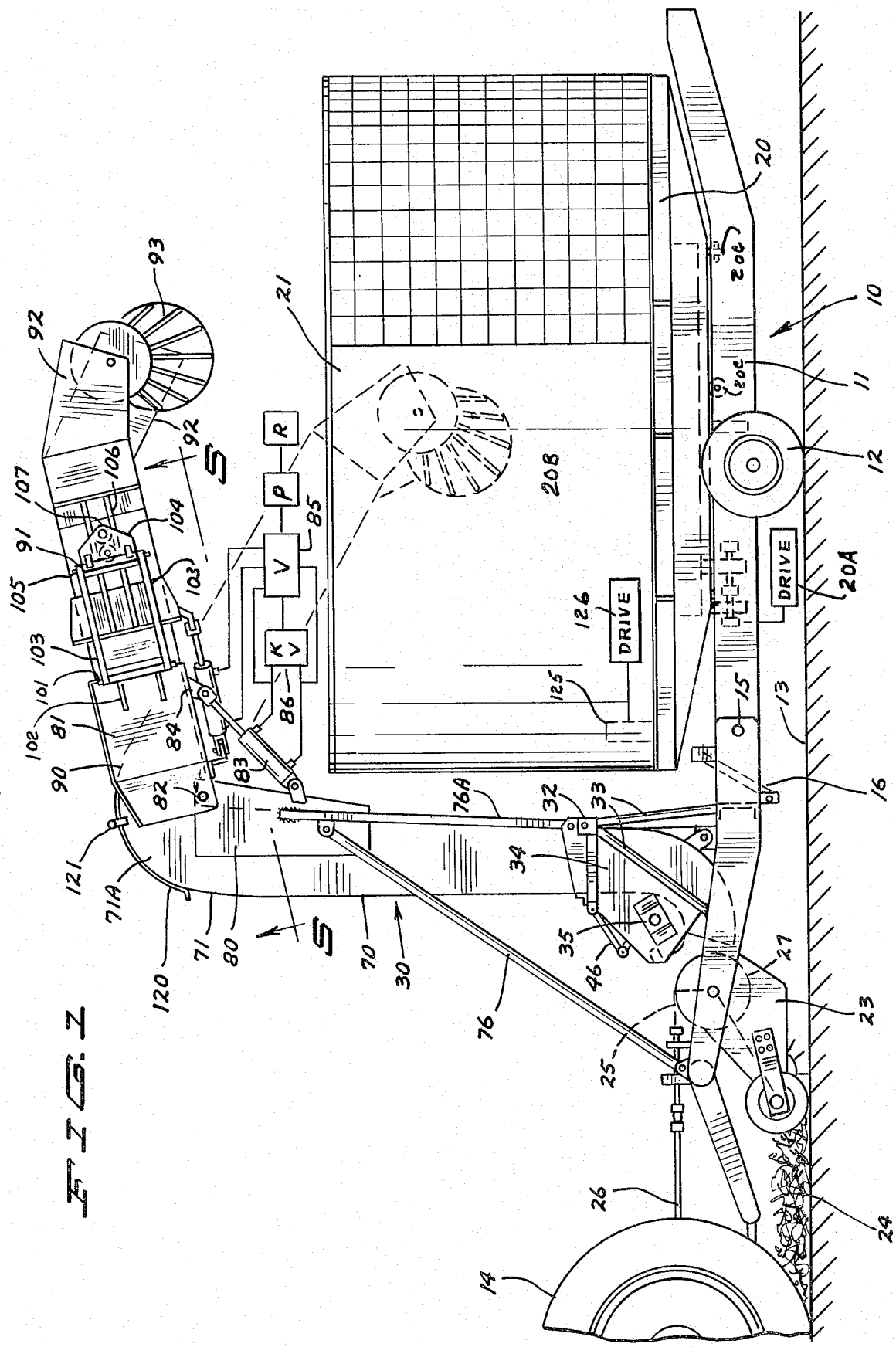
FIG. 1 is a side elevational view of a hay stacking machine including a conveyor member made according to the present invention installed thereon.

A hay stacking machine illustrated generally at 10 is of the type illustrated in the U.S. Pat. No. 3,720,052, issued Mar. 13, 1973 to Joseph A. Anderson et al. for Haystack Forming Machine with a modified hay conveyor mechanism for conveying the hay upwardly and rearwardly onto a rotating platform. The top view of the present application would include a circular platform rotating about its mounting axis. The hay stacking machine includes a main frame 11, mounted onto a plurality of rotatably mounted wheels 12 so that the machine can be moved over the ground 13 by a tractor illustrated fragmentarily at 14, or by another prime mover. The frame 11 is made into two sections that are pivoted together so that the rear end of the machine can be positioned adjacent the ground for unloading a haystack formed on the machine. The frame sections are pivoted together as at 15, and the movement of the frame sections relative to each other is controlled by a hydraulic cylinder 16 acting between suitable brackets as described in the aforementioned U.S. Pat. No. 3,720,052.

A rotating platform or support 20 is rotatably mounted about a central, upright axis to the rear frame section. The platform 20 is circular, and supports an open top hay stack forming cage 21 on the upper surfaces thereof. The cage is merely a wall, usually made of open mesh that will retain the hay on the platform. The platform 20 is driven with suitable drive means, illustrated schematically at 20A so as to be rotated under power about its upright rotational axis 20B. The unit can be mounted as shown in the aforementioned U.S. Pat. No. 3,720,052 or can be mounted and driven with a friction drive wheel which drives the rotating platform, or with any desired and suitable drive. The platform is supported on rollers 20C which engage a circular track under the platform.

As the frame 11 of the hay stacking machine is moved over the ground, a pickup and auger feed assembly indicated at 23 is used for picking up a windrow of loose hay or forage crop that is capable of being stacked as indicated at 24. The pickup 23 is driven through a suitable drive link indicated only in dotted lines at 25 from a power take-off 26 driven by the tractor. The particular drive link can be of any desired arrangement, as can the construction of the pickup. The drive link may be chain or belts used with suitable right angle drive gear boxes as desired. Hydraulic motors also could be used for driving the individual components of the pickup if desired using a hydraulic fluid pressure source on the unit.

The hay pickup 23 includes a pickup drum of suitable design adjacent the ground, and an auger 27 which receives a windrow of hay and moves the windrow in toward the center of the auger. The auger has flighting at its opposite ends that moves the hay toward the center. The windrow is moved by the auger to a conveyor assembly illustrated generally at 30. The conveyor assembly has a feeder mechanism at the lower end of the conveyor. The conveyor assembly then comprises a continually expanding transfer tube or chute leading to the discharge point of the hay above the platform 20 and within the periphery of cage 21. The conveyor assembly 30 includes the feeder portion 31 mounted to the frame 11 adjacent the bottom of the conveyor assembly. The feeder 31 receives material from the pickup and auger feed indicated at 23 in FIG. 3.

Figure 2:
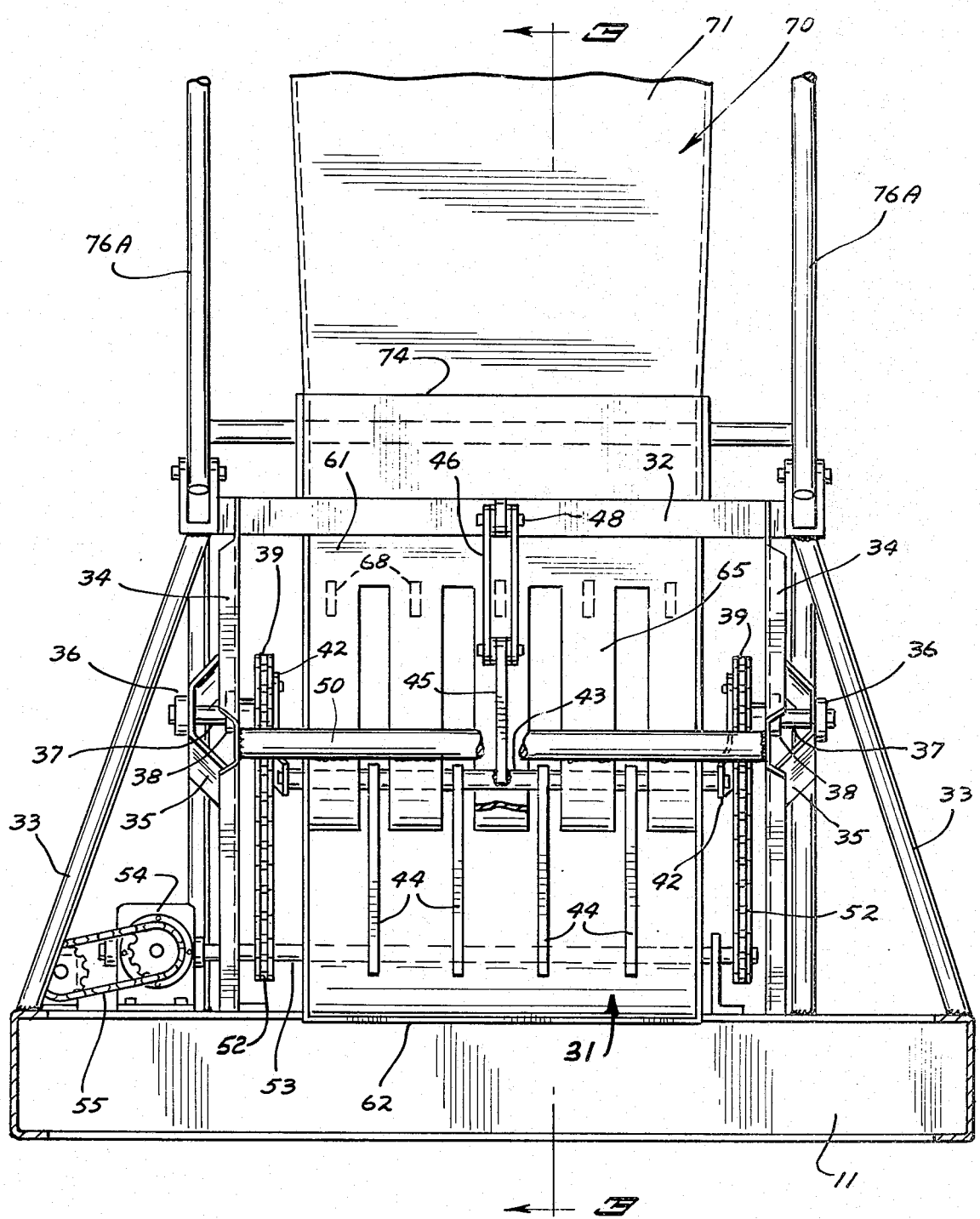
FIG. 2 is a fragmentary front elevational view of a feeder portion of the conveyor assembly of FIG. 1.

The feeder assembly 31 includes a support frame 32 mounted onto the main frame 11 of the machine that is supported by support members indicated at 33. The support frame 32 in turn is forwardly projecting side guide plates 34 on opposite sides thereof, and each of the side plates 34 has a bearing support member 35 fixed to the outside surface thereof and extending outwardly therefrom (See FIG. 2). The bearing support members 35 in turn have bearings 36 mounted thereon, and short shafts 37 are mounted on the bearings 36 and in second bearings 38 that are in turn mounted on the plates 34. The shafts 37 extend through openings in the plates 34 and the outer ends have drive sprockets indicated at 39 drivably mounted thereon. The shafts 38 terminate at the drive sprockets and do not extend across the machine. Each of the sprockets 39 has a crank arm 42 welded or otherwise fixed thereon. The crank arms 42 are positioned in phase (in alignment) with each other on the opposite sprockets, the outer ends of the crank arms are joined together with a cross tube 43. The tube is mounted in suitable bearings on each of the crank arms so that the tube can rotate with respect to the crank arms.

The cross tube 43 has a plurality of feeder fingers or teeth 44 welded thereto. As shown there are four teeth spaced along tube 43 to form the feeder rotor assembly. The cross tube 43 also has a control arm 45 welded thereto, and the outer end of control arm 45 is pivotally connected to a link 46 at a pivot connection 47, and the link 46 in turn is pivotally mounted as at 48 to brackets on the frame 32.

The side plates 34 are further braced together with a cross frame member 50 that is attached between the side plates and fixed in place to support the side plates. The sprockets, crank arms 42 and cross tube 43 which comprise the feed rotor have stable support members. The sprockets 39 are driven through chains by a pair of sprockets 52 that are positioned adjacent the opposite plates 34. The sprockets 52 are drivably mounted onto a shaft 53 suitably supported on the frame and driven from a gear box 54. The gear box 54 in turn can be driven by a chain and sprocket 55 that receives power from the power take-off in a normal manner.

A conveyor feeder chute illustrated generally at 60 is positioned between the plates 34, and mounted on the frame 32. The chute comprises a pair of curved front and rear walls 61 and 62, respectively, joined by end walls 63. The front wall 61 has slots 64 cut thereinto, and these slots 64 form stripper bands 65 between the slots. The ends of the stipper bands 65 are attached to the cross frame member 50 for support.

The front and rear walls 61 and 62 as shown curve downwardly and forwardly and terminate immediately behind the pickup and auger feed assembly. The walls form an inlet opening indicated at 66 into which hay or other forage crops that are being stacked can be introduced by the auger feeder. The auger has a central section of fingers that feeds the material up into this opening. When the unit is operating, the feeder fingers 44 move downwardly to position as shown in FIG. 3 and will engage the hay or forage material and push the material in direction indicated by the arrow 67 through the chute, between the walls provided in the feeder section. The teeth 44 are controlled by the cranks 42 and line 46 so that they enter the hay at the front of the conveyor chute substantially linearly.

Above the feeder section 60, there is positioned another conveyor chute section indicated at 70. This conveyor section 70 comprises a rectangular cross section tube that is made of a forward wall 71, a rear wall 72, and side walls 73, 73. The conveyor chute section 70 has a support frame 74 at the bottom thereof that is pivotally mounted as at 75 to suitable brackets on frame 32 to permit the conveyor section 70, and the rest of the conveyor attached thereto to pivot rearwardly and fold down against the platform 20 when the cage 21 is removed, and when the unit is to be moved along the road. Suitable braces 76A are provided between the upper portions of this conveyor section as shown in FIG. 1 and the main frame.

The conveyor section 70 is made so that it tapers to a greater cross-sectional size in direction away from the feeder section. The front rear wall 71 and 72 diverge from each other at a very gentle angle, and the walls 73 also diverge from each other in direction upwardly or away from the feeder section.

It should be noted that the front wall 61 just above the stripper bands 65 of the feeder section has tapered retainer lugs 68 mounted thereon which are tapered in direction of movement of the forage crop to be moved through the conveyor assembly. The lugs form a ledge or shelf that retards movement of the hay or other material back downwardly in the chute after the fingers 44 have once pushed the hay upwardly past the lugs 68.

At the upper portions of the conveyor section 70, there are a pair of side plates 80 mounted (See FIG. 1) thereon on opposite sides of the conveyor section and these side plates are used to pivotally mount a rearwardly extending tubular conveyor section 81 about a suitable pivot rod 82. The pivot connection can be any desired type of assembly, suitable for carrying the loads necessary. The outer wall 71 of the conveyor section 30 as shown curves rearwardly as indicated at 71A, to form a rearwardly facing discharge opening from the section 70. The position of rear section 81 is controlled about the pivot 82 through a hydraulic cylinder controlled in the usual manner.

The hydraulic cylinder 83 is attached to a suitable bracket mounted in a desired manner between the plates 80, and extends upwardly. The end of the extendable and retractable piston rod engages a bracket 84 on the rearwardly extending conveyor section 81. By extending and retracting the piston rod of cylinder 83 under fluid pressure, the cylinder 84 controls the angular position of the rearwardly extending conveyor section 81 about the pivot rod 82.

The cylinder 83 is controlled with a valve 85, operating in the usual manner. The cylinder 83 has relief valve 86 connected to the opposite ends of the cylinder for permitting the outer end of the conveyor section 81 to move upwardly in order to exert a packing pressure. The relief valve 86 is connected between the rod end and the base end cylinder pressure ports, and when the pressure in the rod end becomes great enough, the relief valve 86 will open to permit oil to flow out of the rod end and permit the conveyor to move upwardly due to external pressure forcing it upwardly. This packing pressure arrangement is also described in the previously mentioned U.S. Pat. No. 3,720,052.

The rearwardly extending conveyor section 81 is made up of two separate portions, and includes a mounting and transition portion 90, and a rear laterally pivoting portion 91. The rear end of the pivoting portion 91 is open for hay discharge and has a pair of rearwardly extending plates 92 mounted thereon between which a freely rotating packer member 93 is rotatably mounted. The mounting and operation of such a packing member is shown in the previously mentioned U.S. Pat. No. 3,720,052, issued Mar. 13, 1973 to Joseph A. Anderson et al., for Hay Stacking Machine and the rotating packer member is used for packing hay building up on the platform 20 under the urging of the cylinder 83, until the cylinder relief valve 86 opens.

Referring specifically to FIG. 5, the transition portion 90 comprises a rectangularly cross section shaped open tube having its walls positioned so that hay or other material coming out the discharge opening of the uprightly extending conveyor section 70 will be moved into the interior of the transition portion 90, and will be moved rearwardly along the interior passage. The transition portion 90 has plates 90A that are bent so that the transition portion goes rearwardly and laterally at an angle to section 70.

The transition portion 90 has a framework 95 at the rear end thereof, and this in turn mounts the swinging rear conveyor portion 91 of the conveyor section 81 with a suitable pin and brackets indicated generally at 96. The laterally swinging portion 91 has an end frame 97 that supports the pivot brackets and pivot pin. The rear swinging conveyor portion 91 pivots with respect to the transition portion 90 about a substantially upright axis and moves laterally so that the rotating packer moves laterally across one side of the platform as the stack is formed. The side of swinging rear portion 91 opposite from pin 96A is supported with a pivoting bracket 100 that is pivotally mounted about an upright axis on a pin 101 to a suitable bracket 102 on the transition portion 90. The bracket 100 includes a pair of spaced, parallel links 103 that are pivotally mounted on pin 101 at one end and which in turn are pivotally connected to a roller carriage 104 at the opposite ends thereof. The roller carriage 104 is mounted for movement between a pair of tracks 106 formed onto the side of the swinging conveyor portion 91. The links 103 are spaced apart to provide a stable support back to the transition portion 90 through pin 101. The tracks 106 are made to support rollers 107 which are rotatably mounted on the carriage 104 so that the rollers can move along tracks 106. The rollers provide a support for the rear swinging portion 91 of the conveyor as the portion 91 swings about the axis of pin 96A. The carriage 104 picks up loads from tracks 106 and transfer vertical loads back to brackets 102 through links 103 and pin 101, while permitting the movement of the swinging rear conveyor portion. FIG. 6 shows this movement schematically in the dotted line position, of rear portion 91.

The control of the rear swinging rear conveyor portion 91 about its pin 96A is through a second hydraulic cylinder 110, the base of which is mounted to a suitable bracket 111 on the conveyor transition portion 90. The cylinder 110 has an extendable and retractable rod that is mounted as at 112 to a bracket 113 attached to the rearwardly extending conveyor section 91. Extension or retraction of the rod of the cylinder 110 through the operation of valve 85 will cause the rear conveyor portion to swing back and forth about the pin axis of the connection 96, while supported on the opposite side through the linkage 100, which includes the spaced apart links 103 for stable support in vertical direction while the carriage 104 moves along the tracks 106.

A plurality of thin flexible sheet metal sheets are provided to close the gap between the ends of the transition portion 90 and the swinging portion 91 when the swinging portion is pivoted to the side to prevent the hay or material from dropping out between these portions.

These flexible pieces include top and bottom sheets 115, which have one edge cut in an arc conforming to the radius of pivot of the edge of swinging portion 91, and a side sheet 116 that is attached to the interior surface of the transition portion 90. The end of the sheet 116 extends into the interior of portion 91 and is left unattached. The sheet 116 then will be forced outwardly against the upright wall of the swinging chute portion 91 as hay moves rearwardly into the chute portion 91. The sheet 116 forms the upright wall to prevent hay from falling outwardly in the gap when portion 91 is pivoted.

It should also be noted that as shown in FIG. 1, there is a sliding cover sheet 120 fixed to the transition portion 90 that in turn is guided by a hold down bar 121 attached to the conveyor section 70. The sheet 120 slides underneath the bar 121 as the entire rear conveyor section 81 including transition portion 90 and swinging portion 91 pivots about the pivot 82 under control of the cylinder 83. Cover sheet 120 keeps the upper portions of the conveyor chute section 70 covered and guides the hay into the lateral or rearwardly extending conveyor portions. The arc of the upper portion of conveyor section 70 causes the hay to be forced rearwardly out through the opening of the chute 70 and into the transition portion 90.

The swinging chute portion 91 terminates substantially at the end of the tracks 106, and hay merely discharges out into the path of the rolling packer member 93 and drops between supports 92 onto the platform 20.

The hay is pushed along through the interior of conveyor chute sections 70 and 81 by feeder fingers 41. The chute sections expand rearwardly in both directions (front to rear and side to side) so that there is a continuous expansion of the cross-sectional area of the chute from the feeder section all the way back to the discharge opening in front of the packer 93. This continuous expansion is in both directions so that the walls of the conveyor chute are nonparallel in all of the conveyor chute sections.

The movement of the swinging rear portion 91 about the pivot axis of support 96 is to move the packing roller toward and away from the central upright axis of rotation of the rotating platform 20. This not only moves the packing member in and out to insure packing across the entire stack as the platform rotates, but also directs the hay to different locations inside the hay cage or retainer 21. The movement back and forth is also shown in the previously mentioned in patent application Ser. No. 139,892 but the movement is accomplished by pivoting the whole conveyor assembly in the prior application. Only the rear portion of the lateral or rearwardly extending conveyor chute is pivoted, as shown in this present application.

When the stacker is moved down the field and powered, a windrow of hay or other forage crop is picked up by the pickup assembly, and the hay is moved up into the feeder section of the conveyor assembly. The teeth 44 are arranged so that they go substantially straight down into the hay adjacent the front of the opening 66 of the conveyor. The teeth then are moved rearwardly and upwardly along the feeder chute as constrained by the crank arms and link 46. The teeth push the hay along the feeder section and into the tubular chute section 70. The upper edge surfaces of lugs 68 engage the hay and retard the hay from sliding back down when the teeth 44 retract. The teeth 44 are retracted substantially straight forwardly from their position shown in FIG. 4 so that they do not drag any substantial amounts of hay through the openings between the stripper bands. The hay that has been pushed up into the upright section 70 of the conveyor will stay in place satisfactorily until another bunch of hay is fed in by the teeth 44. The bunches of hay are fed in sequence, and are pushed through the conveyor chute portions until the hay drops out onto the platform, while the platform is rotating.

The auger and pickup of course continuously feeds hay that is picked up and the hay piles up in under the front portion of the stripper bands until the teeth 44 engage the hay and push it into the feed chute. The rotor assembly carrying the teeth 44 rotates at about 75 rpm, and the hay feed is very rapid. The bunches of hay are pushed into the conveyor chutes rapidly. The interior surfaces of the conveyor sections comprising rectangularly shaped chutes which diverge substantially continuously in transverse cross-sectional area in direction toward the exit opening of the chute in front of the packing roller so that the hay being fed is not compacted as it is fed, but is allowed to slide out in the expanding direction of the chute.

The transition portion 90 of the conveyor has a slight angular offset in lateral direction with respect to the upright section 70 so that the inner end of rotating packing roller 93 is positioned alongside the central axis of the rotating platform when the end of swinging rear portion 91 is in position abutting the end of portion 90, with the cylinder 110 retracted. When the roller is in its position with the swinging portion 91 as shown in FIG. 5, the roller is substantially half-way between the hay cage or retainer 21 and the central upright rotational axis of the platform. The packing roller can be moved all the way out of the edges of the hay retainer, and then back to the central axis so that hay can be deposited along the entire upper surface of the rotating platform as the machines move along the ground. The packer will continuously pack as the hay is being deposited while the platform is rotating. The pressure exerted by the hydraulic cylinder 83 resisting upward movement of the packer packs the hay to form a stack. The packing member is tapered in direction along its axis and is slightly skewed in its axis so that it does not tend to wrap or twist the hay, but travels at substantially the same speed as the hay when the packer is rotating along the top of the hay. The linear speed of movement of the hay is less adjacent the axis of rotation of the platform than it is adjacent the hay cage 21.

A hay push off 125 is provided on the top of the platform and has a drive 126. The cage 21 can be opened at the rear, and the push off operated to move a stack off to the rear after the platform has been tilted so that the rear portions of the platform are adjacent the ground. The platform is tilted rearwardly by pivoting the front frame section about the axis of the supporting tires and wheels, and then the push off is operated to move the stack rearwardly off the platform. The push off can be of any desired construction presently known, and driven in any suitable manner, for example with hydraulic motors.

The feeder construction is relatively low cost because no moving belts or chains are required. The pushing action of the teeth moves hay through the chute positively and reliably.

In FIG. 7 and 8, a modified form of the invention is shown. The feeder, as shown, includes the feeder fingers or teeth 44 which are driven from a crank 42 and are controlled by a control arm 45 and link 46 as in the previous form of the invention. The frame 32 is used as before, and a suitable pickup and auger feed can be used to feed material toward the feeder. The lower section of the conveyor chute is modified, and as shown, a feed conveyor section comprises a tubular member of rectangular cross section as previously described, and indicated generally at 120. This section has a curved lower wall 121, side walls 122, 122 joined to wall 121 and an upper wall 123 that is formed by spaced apart stripper bands 124 that form slots 125 between which the teeth 44 can move. The stripper bands are mounted onto a cross frame member 126 that extends between the side frame members or plates 34 of the machine.

The side walls 122, 122 include offset sections 126, 126 at approximately the level where the teeth 44 are withdrawn from the conveyor in an operating cycle as shown in FIG. 7. This permits hay that is being pushed directly by the teeth 44 upwardly in the conveyor to expand laterally outwardly (See FIG. 8) and the hay tends to be retained on the ledges or shoulders formed by these expanding sections 126, 126. As can be seen, the shoulders form a part of the continual increase in cross sectional area of the conveyor in direction away from the feed section.

An upper conveyor chute 130 is mounted to the lower section in the same manner as the chute 70, and is pivotally mounted to the frame 32 with the hinge 131, and suitable brackets.

As can be seen, the chute 130 is tubular and includes side walls 132, a front wall 133, a rear wall 134. The rear wall 134 has an offset forming a shoulder 135 adjacent to the junction between the lower conveyor section 120 and the upper chute section 130, so that again when hay is pushed up into the chute 136 it will again be permitted to expand onto the ledge 135. The ledge 135 will provide a retaining action to tend to keep the hay from falling back down into the feed section 132.

The two offsets 126, 126 and the offset 135 tend to prevent hay that has been pushed up into the chute from falling back down into the path of travel of the teeth during their retracting movement so that an additional bunch of hay can be moved into the feed section without causing any substantial trouble. The teeth will compress the hay as they move to push additional hay through the feed chute. However, the expanding chute including the offsets or shoulders tend to retain the hay from falling down when the teeth are retracted.

The offset 135 also results in expansion in the cross sectional area of the chute so that there is a continuous expansion all the way from the feed section to the outer end of the chute as previously described.

The offsets or shoulders 126 and 135 aid in feeding through a chute of this type even if the chute did not continuously expand because the shoulders prevent the hay from falling back into the area of movement of the feeder teeth.

In addition, as can be seen, the lower wall 121 of the lower feed section supports a floor plate 140 spaced from wall 121 by spaces 140A. The floor plate 140 comprises a continuous plate which follows the contour of wall 121 and which has a bent over lip 141 at the forward end thereof joining the forward edge of the lower wall 121. A plurality of slots 142 are defined in the floor plate. There is one of the slots 142 aligning with each of the slots 125 in the upper wall 123, and therefore each of the slots 142 is aligned with one of the teeth 44. The floor plate is positioned so that as the teeth move upwardly in their path of travel from the inlet end of the conveyor chute toward the outlet, the teeth will be protruding just slightly through the slots 142. This will prevent the tips of the teeth 44 from having hay wrap over the tips and being carried with the teeth.

The floor plate 140 is made so that the slots are open to the rear or upper end indicated at 143, and thus the teeth pass out through the rear. The teeth 44, when driven by crank 42 and links 45 and 46, will enter almost straight down into the slots 142 at the forward end of floor plate 140. The teeth are pushed through the slots and do not slide up over the forward edge portion 141 as the crank arm rotates. The teeth then move in the slots 141 with the hay riding along the top of the floor plate 140 until the hay gets past the end 143 where the floor plate ends. The hay will expand slightly where the floor plate terminates. The additional offset or shoulder 126 provides further expansion for the hay and forms a small ledge to tend to hold the hay to keep it from falling back down into the feeding area, and the final shoulder or ledge 135 further aids in holding the hay. The conveyor chute expands continuously so that there is no substantial compression of hay as it moves through the chute from the feed or inlet end to the chute outlet over the stacking bed. The ledges form a part of this continuous expansion.

What is claimed is:

1. In a forage crop stacking machine having a frame, a stack forming bed mounted for movement relative to said frame, means for delivering forage crop material to said bed comprising a forage crop material feeder including a chute member forming a conveyor tube mounted on said frame, said conveyor tube including an uprightly extending section having a lower end and an upper end, and a laterally extending section positioned adjacent the upper end of the upwardly extending section and forming a discharge opening above said bed, both said uprightly extending section and said laterally extending section being formed with four wall members joined to form a rectilinear cross section that has a central axis, means to feed forage crop material into said tube located adjacent said lower end comprising a feeder fork means having a plurality of teeth thereon, said teeth having teeth tips at the outer ends thereof and engaging forage crop material at the lower end of said conveyor tube, and said teeth moving for a distance along said conveyor tube with the teeth inside the conveyor tube so that the teeth push forage crop material toward the discharge opening of said conveyor tube, means mounting said feeder fork means so said teeth enter the conveyor tube along a substantially linear line and the teeth tips are moved in an arcuate path inside said conveyor tube and so said teeth are withdrawn from said conveyor tube along a different substantially linear line, one of said four walls of said conveyor tube forming a backing wall positioned adjacent the path of travel of the teeth tips and formed generally to correspond to the arcuate path of said teeth tips so said teeth tips remain substantially the same distance from said backing wall throughout the travel of the teeth in said conveyor tube, and floor means spaced from and mounted on said backing wall, said floor means including slot means, the end portions of said teeth adjacent said tips protruding through said slot means for at least a portion of the distance of movement of said teeth in said conveyor tube, all of the wall members of said conveyor tube sections expanding from the central axis to enlarge the cross sectional area of the conveyor tube from adjacent said means to feed forage crop material substantially continuously to said discharge opening.

2. The machine of claim 1 and means mounting said laterally extending section on said frame about an axis to permit moving the discharge opening to different side to side positions with respect to said platform.

3. The combination specified in claim 2 wherein said laterally extending section includes an outer end swinging portion and said means mounting said laterally extending section includes means to pivotally mount said outer end swinging portion about a substantially upright axis so as to permit an end of said swinging portion remote from said upright axis to move from side to side with respect to said platform a preselected amount.

4. The combination specified in claim 3 and hydraulic cylinder means for swinging said swinging portion about its upright axis.

5. The combination as specified in claim 1 wherein said feeder fork means extends in direction across the conveyor tube and moves between substantially parallel side walls, means to cause said feeder fork means to withdraw from said conveyor tube after moving for said distance along said conveyor tube, and wall means on said conveyor tube forming at least one shoulder adjacent the feeder fork means facing toward the discharge opening with reference to the direction of movement of forage crop material through said conveyor tube, said shoulder expanding the conveyor tube abruptly without first causing a construction in said conveyor tube.

6. A forage crop stacking machine for crop material such as hay, including a frame, a stack forming bed mounted for movement relative to said frame, means for delivering crop material to said bed comprising feeding means including a chute member forming a conveyor tube mounted on said frame, said conveyor tube including an uprightly extending section having a lower end and an upper end, and a laterally extending section having an outer end portion forming a discharge opening, first means mounting said laterally extending section to said uprightly extending section adjacent the upper end of the uprightly extending section about a first substantially horizontal axis and second means movable about said first axis and positioned adjacent one side of said laterally extending section mounting said laterally extending section for movement about a separate generally upright axis, power means to move said laterally extending section about said upright axis, feeder means adjacent the lower end of said tube to feed crop material into said conveyor tube and to push crop material along said conveyor tube in direction toward said discharge opening, said conveyor tube including means forming at least one shoulder adjacent the feeder means and facing in direction toward the discharge opening with reference to the direction of movement of forage crop material, said shoulder expanding the conveyor tube abruptly without first causing a constriction in said conveyor tube, a rotating packing member rotatably mounted at an outer end of said laterally extending section in position to engage crop material discharged through said discharge opening and carried on said bed, said rotating packing member being movable with the outer end of said laterally extending section about said upright axis, and means to permit exerting a force yieldingly resisting upward movement of said laterally extending section and said packing member about said first axis.

7. The combination specified in claim 6 wherein said feeder means comprises a feeder fork means having a plurality of teeth thereon, said teeth engaging forage crop material at the lower end of said conveyor tube, and moving for a distance along said conveyor tube to push forage crop material toward the discharge opening of said conveyor tube.

8. The combination specified in claim 6, said conveyor tube having backing wall positioned to be adjacent to ends of said teeth and configured to correspond to the path of movement of said teeth so said teeth remain substantially the same distance from said backing wall throughout the travel of the teeth in said conveyor tube.

9. In a forage crop machine having a conveyor thereon, and means for receiving forage crop materials from said conveyor, means for delivering forage crop material to said conveyor including a feed member, said feed member having a chute forming a conveyor tube mounted on said frame, a feeder fork member having a plurality of teeth thereon mounted at a first end of said conveyor tube, drive means to drive said feeder fork in a path of movement whereby said feeder fork will engage forage crop material and move said forage crop material into said conveyor tube, said teeth engaging forage crop material and moving for a distance along said conveyor tube adjacent the inlet thereof to push said forage crop material into said conveyor tube and toward the opposite end of said conveyor tube, said drive means including means to withdraw said feeder fork member from said conveyor tube, said feeder fork moving between substantially parallel walls, said parallel walls each including an offset section to expand said parallel walls abruptly to form two shoulder portions tending to engage and hold forage crop material moved toward the opposite end of said conveyor tube past said shoulder portions by said feeder fork member, said conveyor tube including front and rear wall means which do not converge or restrict the opening thereof from the first end thereof to the opposite end thereof, and floor means spaced from and mounted on said rear wall means, said floor means including slot means, the end portion of said teeth protruding through said slot means for at least a portion of the distance of movement of said teeth.

* * * * *